(12) United States Patent
Xiang et al.

(10) Patent No.: US 10,924,161 B2
(45) Date of Patent: Feb. 16, 2021

(54) METHOD FOR PERFORMING COMMUNICATION BASED ON BEAM GROUP, AND DEVICE

(71) Applicant: HUAWEI TECHNOLOGIES CO., LTD., Guangdong (CN)

(72) Inventors: Gao Xiang, Chengdu (CN); Huang Huang, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/520,828

(22) Filed: Jul. 24, 2019

(65) Prior Publication Data
US 2019/0349031 A1 Nov. 14, 2019

Related U.S. Application Data

(63) Continuation of application No. PCT/CN2018/071510, filed on Jan. 5, 2018.

(30) Foreign Application Priority Data

Jan. 25, 2017 (CN) .......................... 201710061296.1

(51) Int. Cl.
*H04B 7/0408* (2017.01)
*H04B 7/06* (2006.01)
(Continued)

(52) U.S. Cl.
CPC .......... *H04B 7/0408* (2013.01); *H04B 7/046* (2013.01); *H04B 7/0617* (2013.01);
(Continued)

(58) Field of Classification Search
CPC .... H04B 7/0408; H04B 7/0695; H04B 7/088; H04B 7/046; H04B 7/0617; H04B 7/0691; H04W 24/02; H04W 72/046
See application file for complete search history.

(56) References Cited

U.S. PATENT DOCUMENTS

2013/0045690 A1  2/2013  Seol et al.
2013/0155847 A1  6/2013  Li et al.
(Continued)

FOREIGN PATENT DOCUMENTS

CN  101453255 A  6/2009
CN  103596245 A  2/2014
(Continued)

OTHER PUBLICATIONS

3GPP TSG RAN WG1 NR Ad-Hoc Meeting,R1-1700124,:"UE reporting for beam management",ZTE,Spokane, USA, Jan. 16-20, 2017,total 9 pages.
(Continued)

*Primary Examiner* — Janice N Tieu
(74) *Attorney, Agent, or Firm* — Womble Bond Dickinson (US) LLP

(57) ABSTRACT

This application describes methods, systems, and techniques for performing communication based on a beam group. In a method, for example, a terminal device groups transmit beams of a network device based on a receive beam of the terminal device. The method may also include the terminal device determining spatial direction information of each beam group. Furthermore, the method may include the terminal device sending, to the network device, the spatial direction information of each beam group or information about a correlation between beam groups determined based on the spatial direction information.

10 Claims, 6 Drawing Sheets

(51) Int. Cl.
*H04W 72/04* (2009.01)
*H04B 7/0456* (2017.01)

(52) U.S. Cl.
CPC ......... *H04B 7/0691* (2013.01); *H04B 7/0695* (2013.01); *H04W 72/046* (2013.01)

(56) References Cited

U.S. PATENT DOCUMENTS

| | | |
|---|---|---|
| 2016/0105872 A1 | 4/2016 | Kuo |
| 2016/0269093 A1 | 9/2016 | Seol et al. |
| 2017/0223552 A1 | 8/2017 | Roy et al. |
| 2018/0138963 A1* | 5/2018 | Hernando ............ H04L 27/2657 |
| 2019/0089420 A1* | 3/2019 | Koskela ............... H04B 7/0417 |

FOREIGN PATENT DOCUMENTS

| | | |
|---|---|---|
| CN | 103733540 A | 4/2014 |
| CN | 103929280 A | 7/2014 |
| CN | 104115419 A | 10/2014 |
| CN | 104303477 A | 1/2015 |
| CN | 104660311 A | 5/2015 |
| CN | 105052199 A | 11/2015 |
| EP | 2988429 A1 | 2/2016 |

OTHER PUBLICATIONS

3GPP TSG RAN WG1 Meeting #86bis,R1-1609414,:"Discussion on beam management aspects for DL MIMO", Huawei, HiSilicon,Lisbon, Portugal, Oct. 10-14, 2016,total 5 pages.

3GPP TSG RAN WG1 NR Ad-Hoc Meeting,R1-1701107:"On QCL Framework and Configurations in NR" .Nokia, Spokane, USA, Jan. 16-20, 2017,total 6 pages.

CATT,"Discussion on beam reporting",3GPP TSG RAN WG1 AH_NR Meeting R1-1700201,Spokane, USA Jan. 16-20, 2017,total 4 pages.

CMCC,"Discussion on UE triggered beam reporting for beam recovery",3GPP TSG RAN WG1 NR Ad-Hoc Meeting R1-1700436,Spokane, USA, Jan. 16-20, 2017,total 6 pages.

* cited by examiner

METHOD FOR PERFORMING COMMUNICATION BASED ON BEAM GROUP, AND DEVICE

CROSS-REFERENCE TO RELATED APPLICATIONS

This application is a continuation of International Application No. PCT/CN2018/071510, filed on Jan. 5, 2018, which claims priority to Chinese Patent Application No. 201710061296.1, filed on Jan. 25, 2017. The disclosures of the aforementioned applications are hereby incorporated by reference in their entireties.

TECHNICAL FIELD

This application relates to the field of wireless communications technologies, and in particular, to a method for performing communication based on a beam group, and a device.

BACKGROUND

In a fifth-generation (5G) communications system, wireless communication with a larger bandwidth and a higher transmission rate is implemented by using a carrier frequency (usually, greater than or equal to 6 GHz) higher than that in long term evolution (LTE), for example, a frequency band of 28 GHz, 38 GHz, or 72 GHz. Because the carrier frequency is relatively high, a radio signal transmitted at the carrier frequency suffers from more serious fading in a space propagation process, and even the radio signal can hardly be detected at a receive end. In view of this, in the 5G communications system, a beam forming (BF) technology is used to obtain a beam with good directivity, to increase power in a transmit direction, and increase a signal to interference plus noise ratio (SINR) at the receive end. A hybrid beamforming (HBF) technology is an optimal choice to expand coverage and control antenna array costs, and the hybrid beamforming technology includes both analog beamforming (ABF) and digital beamforming (DBF). The DBF is similar to multiple-input multiple-output (MIMO) in LTE, and for the ABF, a direction of an analog beam is adjusted by changing a weight of each array element in an antenna array.

To further improve communication quality, a terminal device also generates analog beams in different directions by using the beamforming technology, to receive and send data. Because a network device, for example, a transmission reception point (TRP), and a terminal device communicate with each other by using relatively narrow analog beams, better communication quality is obtained only when the analog beams used for sending and receiving, are aligned. Therefore, it is determined in the third generation partnership project (3GPP) radio layer 1 (RAN1) meeting that a beam pair (a transmit beam and a receive beam) between a TRP and a terminal device is determined by using a beam sweeping process in 5G new radio (NR), as shown in FIG. 1. In addition, to improve a cell coverage capability, a cell in 5G NR may include a plurality of TRPs, and each TRP may transmit a plurality of different analog beams.

However, high-frequency communication, a scattering capability and a diffraction capability of a radio wave are greatly weakened. Therefore, in NR, a communication link carried on a beam pair is easily affected by mobility and rotation of a terminal device, and blockage of another object. When the beam pair used as a carrier of the communication link fails, the terminal device needs to perform a process such as initial access or beam training again, and communication cannot be recovered immediately.

SUMMARY

Embodiments of the present invention described herein provide a method for performing communication based on a beam group, and a device. A terminal device sends spatial direction information of a beam group or information about a correlation between beam groups to a network device, so that the network device selects, based on information reported by the terminal, another beam pair for communication when a beam pair currently used for communication fails.

According to a first aspect, an embodiment of the present invention provides a method for performing communication based on a beam group, including:

A terminal device groups transmit beams of a network device based on a receive beam of the terminal device. For example, the terminal device may group transmit beams, into one group, that each can form a beam pair with a same receive beam of the terminal device. The terminal device determines spatial direction information of each beam group, and then sends the spatial direction information of each beam group to the network device, or sends, to the network device, information that is about a correlation between beam groups and that is determined based on the spatial direction information.

If a transmit beam in a first beam group and a first receive beam of the terminal device can form a beam pair, a transmit beam in a second beam group and a second receive beam of the terminal device can form a beam pair, and a correlation between the first beam group and the second beam group is relatively low, when the beam pair formed by the transmit beam belonging to the first beam group and the first receive beam of the terminal device is blocked and consequently cannot be used for normal communication, the network device may recover communication by using the beam pair formed by the transmit beam in the second beam group and the second receive beam of the terminal device, thereby preventing the terminal device from performing a process such as initial access or beam training again. In contrast, if a correlation between the first beam group and the second beam group is relatively high, when the beam pair formed by the transmit beam belonging to the first beam group and the first receive beam of the terminal device is blocked, a possibility that the transmit beam in the second beam group and the second receive beam of the terminal device are blocked is also relatively high. If the network device recovers communication by using the beam pair formed by the transmit beam in the second beam group and the second receive beam of the terminal device, a failure possibility is also relatively high.

Therefore, in the method embodiments, the terminal device sends the correlation between the beam groups or the spatial direction information of each beam group to the network device, so that the network device may obtain the information about the correlation between the beam groups, or the network device may determine the information about the correlation between the beam groups based on the spatial direction information. Further, when a beam pair currently serving the terminal device and the network device fails, the network device selects another beam pair for communication based on the information about the correlation between the beam groups.

With reference to the first aspect, in a first possible embodiment of the first aspect, the terminal device may determine the spatial direction information of each beam group in the following manners.

In a first manner, the terminal device determines components of a spatial direction of each beam group in a horizontal direction and a vertical direction. Usually, a radiation direction of a beam may be represented by components in the horizontal direction and the vertical direction, and the network device may determine a spatial direction of a beam group based on components of the beam group in the horizontal direction and the vertical direction.

In a second manner, the terminal device determines a direction vector of a spatial direction of each beam group. The terminal device may further construct the direction vector for each beam group, so that the network device may determine the information about the correlation between the beam groups based on the direction vector of each beam group.

In a third manner, the terminal device determines, based on a pre-agreed quantization level in a horizontal direction and a pre-agreed quantization level in a vertical direction, quantization levels to which a spatial direction of each beam group belongs in the horizontal direction and the vertical direction. For example, nine quantization levels: −4θ, −3θ, −2θ, . . . , and 4θ may be obtained through division in advance in both the horizontal direction and the vertical direction, and the quantization levels to which the spatial direction of each beam group belongs in the horizontal direction and the vertical direction are respectively determined.

In a fourth manner, the terminal device may determine a number of a spatial direction of each beam group according to a pre-agreed space area division rule.

Certainly, the space area division rule may alternatively be determined by the terminal device. While sending the number of the spatial direction of each beam group to the network device, the terminal device further needs to send the space area division rule to the network device.

With reference to the first aspect, in a second possible embodiment of the first aspect, when sending, to the network device, the information that is about the correlation between the beam groups and that is determined based on the spatial direction information, the terminal device may determine components of a spatial direction of each beam group in a horizontal direction and a vertical direction based on the spatial direction information of each beam group; then separately group the beam groups based on the components in the horizontal direction and the components in the vertical direction; and the terminal device sends grouping information of the beam groups in the horizontal direction and the vertical direction to the network device.

In the method embodiments, the terminal device may relatively quickly determine the information about the correlation between the beam groups, and send the information about the correlation to the network device, so that the network device does not need to calculate the correlation between the beam groups again.

With reference to the first aspect, in a third possible embodiment of the first aspect, the terminal device may alternatively calculate, according to indication information received from the network device, correlations between a beam group in which a receive beam currently serving the terminal device is located and other beam groups; and send the calculated correlations to the network device; or the terminal device may sort the other beam groups based on the calculated correlations, and send a sorting result to the network device.

In the method embodiments, the network device sends the indication information to the terminal device as required, and the terminal device sends, to the network device, calculated information about the correlations between the beam group in which the receive beam currently serving the terminal device is located and the other beam groups, so that the network device may directly select a beam pair from the other beam groups for communication based on the information about the correlations that is reported by the terminal device.

With reference to the first aspect, in a fourth possible embodiment of the first aspect, the method further includes: when a first beam pair currently used for communication between the network device and the terminal device fails, sending, by the terminal device, an access request to the network device based on the information about the correlation between the beam groups by using a second beam pair, where a transmit beam of the network device in the first beam pair belongs to a first beam group, a transmit beam of the network device in the second beam pair belongs to a second beam group, and a correlation between the second beam group and the first beam group meets a preset condition.

When the first beam pair currently used for communication between the network device and the terminal device fails, the terminal device may alternatively communicate with the network device by actively switching to another beam pair that has a relatively low correlation with the first beam pair. For example, the terminal device may send the access request to the network device by using a random access resource carried on the second beam pair.

With reference to the fourth possible embodiment of the first aspect, in a fifth possible embodiment of the first aspect, the second beam group is a beam group that has a lowest correlation with the first beam group in all beam groups maintained by the terminal device; or the correlation between the second beam group and the first beam group is less than or equal to a preset threshold in the implementation, a case in which the second beam pair to which switching is performed is also interfered with and cannot be used for normal communication can be avoided.

According to a second aspect, an embodiment of the present invention provides a method for performing communication based on a beam group, including:

obtaining, by a network device, a correlation between beam groups, where the beam groups are obtained after transmit beams of the network device are grouped based on a receive beam of a terminal device; and when a first beam pair used for communication between the network device and the terminal device fails, selecting, by the network device, a second beam pair based on the correlation between the beam groups, to communicate with the terminal device, where a transmit beam of the network device in the first beam pair belongs to a first beam group, a transmit beam of the network device in the second beam pair belongs to a second beam group, and a correlation between the second beam group and the first beam group meets a preset condition.

A communication link carried on a beam pair is easily affected by mobility and rotation of the terminal device and blockage of another object. Therefore, when the first beam pair currently used for communication fails, the network device may select, based on obtained information about the correlation between the beam groups, a beam pair that has a relatively low correlation with the first beam pair for communication, to avoid a case in which a beam pair to which switching is performed is also interfered with and cannot be used for normal communication.

With reference to the second aspect, in a first possible embodiment of the second aspect, the second beam group selected by the network device is a beam group that has a lowest correlation with the first beam group in all beam groups maintained by the network device; or the correlation between the second beam group and the first beam group is less than or equal to a preset threshold.

The network device selects the second beam group that has a low correlation with the first beam group, to avoid a case in which the second beam pair to which switching is performed is also interfered with and cannot be used for normal communication. Therefore, the network device may select, as the second beam group, the beam group that has a lowest correlation with the first beam group. Alternatively, a correlation threshold may be preset, and if a correlation between a beam group and the first beam group is less than or equal to the preset threshold, it may be considered that the second beam group is not subject to same interference as that to the first beam group, and can be used for communication. In this case, the network device may select, as the second beam group, one of beam groups that meet the condition.

With reference to the second aspect, in a second possible embodiment of the second aspect, the network device may obtain the information about the correlation between the beam groups in the following manners: 1. The network device receives spatial direction information that is of each beam group and that is sent by the terminal device, and determines the information about the correlation between the beam groups based on the spatial direction information. 2. The network device receives the information that is about the correlation between the beam groups and that is sent by the terminal device.

In different scenarios, information about beam groups that is reported by the terminal device is not necessarily the same. The terminal device may report only the spatial direction information of each beam group, to avoid an increase in a load of the terminal device. Alternatively, in some scenarios, the terminal device may report the information about the correlation between the beam groups. For example, the terminal device receives, from the network device, indication information for requiring the terminal device to report the information about the correlation between the beam groups. Therefore, the network device may directly obtain the information about the correlation between the beam groups from content reported by the terminal device.

With reference to the second possible embodiment of the second aspect, in a third possible embodiment of the second aspect, if the spatial direction information that is of each beam group and that is sent by the terminal device is a number of a spatial direction of each beam group, the network device determines, based on the number of the spatial direction of each beam group and a predetermined space area division rule, an area in which the spatial direction of each beam group is located, so as to determine the information about the correlation between the beam groups based on the area in which the spatial direction of each beam group is located.

With reference to the second possible embodiment of the second aspect, in a fourth possible embodiment of the second aspect, if the spatial direction information that is of each beam group and that is sent by the terminal device is components of a spatial direction of each beam group in a horizontal direction and a vertical direction, the network device constructs a direction vector for each beam group based on the components of the spatial direction of each beam group in the horizontal direction and the vertical direction, and determines the information about the correlation between the beam groups based on the direction vector of each beam group.

With reference to the second possible embodiment of the second aspect, in a fifth possible embodiment of the second aspect, if the spatial direction information that is of each beam group and that is sent by the terminal device is a direction vector of each beam group, the network device calculates the correlation between the beam groups based on the direction vector of each beam group.

With reference to the second possible embodiment of the second aspect, in a sixth possible embodiment of the second aspect, the network device may rather send indication information to the terminal device, where the indication information is used to obtain information about correlations between the first beam group and other beam groups; and if the terminal device reports, to the network device, the information about the correlations between the first beam group and the other beam groups after receiving the indication information, the network device does not need to perform calculation, and may directly obtain the information about the correlation between the beam groups based on content reported by the network device.

In another embodiment, alternatively, the terminal device may not perform the step of grouping transmit beams of the network device, in other words, one beam pair is one group, and in this case, the terminal device determines a spatial direction of each beam pair or information about a correlation between beam pairs, and sends the spatial direction or the information about the correlation to the network device. A method performed by the terminal device includes:

determining, by the terminal device, spatial direction information of each beam pair; and sending, by the terminal device to the network device, the spatial direction information of each beam pair or the information that is about the correlation between the beam pairs and that is determined based on the spatial direction information; and correspondingly, a method performed by the network device includes:

obtaining, by the network device, the information about the correlation between the beam pairs; and when a first beam pair currently used for communication between the network device and the terminal device fails, selecting, by the network device, a second beam pair based on the information about the correlation between the beam pairs, to communicate with the terminal device, where a correlation between the second beam pair and the first beam pair meets a preset condition.

Other operation preformed by the terminal device are consistent with those in the corresponding method in the first aspect, and other operations of the network device are consistent with those in the corresponding method in the second aspect.

According to a third aspect, an embodiment of the present invention provides a terminal device, including: a processor, and a memory and a transceiver that are both connected to the processor, where the processor is configured to read a program in the memory, to perform the following process:

grouping transmit beams of a network device based on a receive beam of the terminal device; determining spatial direction information of each beam group; and sending, to the network device by using the transceiver, the spatial direction information of each beam group or information that is about a correlation between the beam groups and that is determined based on the spatial direction information.

With reference to the third aspect, in a first possible embodiment of the third aspect, when determining, the spatial direction information of each beam group, the processor is configured to determine components of a spatial direction of each beam group in a horizontal direction and a vertical direction; or determine a direction vector of a spatial direction of each beam group; or determine, based on a pre-agreed quantization level in a horizontal direction and a pre-agreed quantization level in a vertical direction, quantization levels to which a spatial direction of each beam group respectively belongs in the horizontal direction and the vertical direction; or determine a number of a spatial direction of each beam group, where the number of the spatial direction is determined according to a pre-agreed space area division rule.

With reference to the third aspect, in a second possible embodiment of the third aspect, when sending, to the network device by using the transceiver, the information that is about the correlation between the beam groups and that is determined based on the spatial direction information, the processor is configured to: determine components of a spatial direction of each beam group in a horizontal direction and a vertical direction based on the spatial direction information; group the beam groups based on the components in the horizontal direction; group the beam groups based on the components in the vertical direction; and send, by using the transceiver, grouping information of the beam groups in the horizontal direction and the vertical direction to the network device.

With reference to the third aspect, in a third possible embodiment of the third aspect, when sending, to the network device by using the transceiver, the information that is about the correlation between the beam groups and that is determined based on the spatial direction information, the processor is configured to: calculate, according to indication information received from the network device, information about correlations between a beam group in which a receive beam currently serving the terminal device is located and other beam groups; and send the calculated information about the correlations to the network device by using the transceiver; or sort the other beam groups based on the calculated information about the correlations, and send a sorting result to the network device by using the transceiver.

With reference to the third aspect, in a fourth possible embodiment of the third aspect, the processor is further configured to: when a first beam pair currently used for communication between the network device and the terminal device fails, select a second beam pair based on the information that is about the correlation between the beam groups and that is determined based on the spatial direction information of each beam group, to send an access request to the network device by using the transceiver, where a transmit beam of the network device in the first beam pair belongs to a first beam group, a transmit beam of the network device in the second beam pair belongs to a second beam group, and a correlation between the second beam group and the first beam group meets a preset condition.

According to a fourth aspect, an embodiment of the present invention provides a network device, including: a processor, and a memory and a transceiver that are both connected to the processor, where
the processor is configured to read a program in the memory, to perform the following process:

obtaining information about a correlation between beam groups, where the beam groups are obtained after transmit beams of the network device are grouped based on a receive beam of a terminal device; and when a first beam pair currently used for communication between the network device and the terminal device fails, selecting a second beam pair based on the information about the correlation between the beam groups, to communicate with the terminal device by using the transceiver, where a transmit beam of the network device in the first beam pair belongs to a first beam group, a transmit beam of the network device, in the second beam pair belongs to a second beam group, and a correlation between the second beam group and the first beam group meets a preset condition.

With reference to the fourth aspect, in a first possible embodiment of the fourth aspect, the second beam group is a beam group that has a lowest correlation with the first beam group in all beam groups maintained by the network device; or the correlation between the second beam group and the first beam group is less than or equal to a preset threshold.

With reference to the fourth aspect, in a second possible embodiment of the fourth aspect, when obtaining the information about the correlation between the beam groups, the processor is configured to: receive, by using the transceiver, the information that is about the correlation between the beam groups and that is sent by the terminal device; or receive, by using the transceiver, spatial direction information that is of each beam group and that is sent by the terminal device, and determine the information about the correlation between the beam groups based on the spatial direction information.

With reference to the second possible embodiment of the fourth aspect, in a third possible embodiment of the fourth aspect, if the spatial direction information that is of each beam group and that is sent by the terminal device is a number of a spatial direction of each beam group, when determining the information about the correlation between the beam groups based on the spatial direction information, the processor is configured to:

determine, based on the number of the spatial direction of each beam group and a pre agreed space area division rule, an area in which the spatial direction of each beam group is located, and determine, by the network device, the information about the correlation between the beam groups based on the area in which the spatial direction of each beam group is located.

With reference to the second possible embodiment of the fourth aspect, in a fourth possible embodiment of the fourth aspect, if the spatial direction information that is of each beam group and that is sent by the terminal device is components of a spatial direction of each beam group in a horizontal direction and a vertical direction, when determining the information about the correlation between the beam groups based on the spatial direction information, the processor is configured to:

construct a direction vector for each beam group based on the components of the spatial direction of each beam group in the horizontal direction and the vertical direction, and determine the information about the correlation between the beam groups based on the direction vector.

With reference to the second possible embodiment of the fourth aspect, in a fifth possible embodiment of the fourth aspect, if the spatial direction information that is of each beam group and that is sent by the terminal device is a direction vector of each beam group, when determining the information about the correlation between the beam groups based on the spatial direction information, the processor is configured to calculate the correlation between the beam groups based on the direction vector.

With reference to the second possible embodiment of the fourth aspect, in a sixth possible embodiment of the fourth aspect, when receiving, by using the transceiver, the information that is about the correlation between the beam groups and that is sent by the terminal device, the processor is configured to: send indication information to the terminal device by using the transceiver, where the indication information is used to obtain information about correlations between the first beam group and other beam groups; and receive, by using the transceiver, the information that is about the correlations between the first beam group and the other beam groups and that is sent by the terminal device.

According to a fifth aspect, an embodiment of the present invention provides a terminal, including: a grouping module, configured to group transmit beams of a network device based on a receive beam of the terminal device; a determining module, configured to determine spatial direction information of each beam group; and a sending module, configured to send, to the network device, the spatial direction information of each beam group or information that is about a correlation between the beam groups and that is determined based on the spatial direction information.

According to a sixth aspect, an embodiment of the present invention provides a network device, including: an obtaining module, configured to obtain information about a correlation between beam groups, where the beam groups are obtained after transmit beams of the network device are grouped based on a receive beam of a terminal device; and a communications module, configured to: when a first beam pair currently used for communication between the network device and the terminal device fails, select a second beam pair based on the information about the correlation between the beam groups, to communicate with the terminal device, where a transmit beam of the network device in the first beam pair belongs to a first beam group, a transmit beam of the network device in the second beam pair belongs to a second beam group, and a correlation between the second beam group and the first beam group meets a preset condition.

Another aspect of this application provides a computer program product including an instruction. When the computer program product runs on a computer, the computer is enabled to perform the method in each of the foregoing aspects.

Another aspect of this application provides a computer readable storage medium. The computer readable storage medium stores an instruction, and when the instruction runs on a computer, the computer is enabled to perform the method in each of the foregoing aspects.

DESCRIPTION OF EMBODIMENTS

Figure 1:
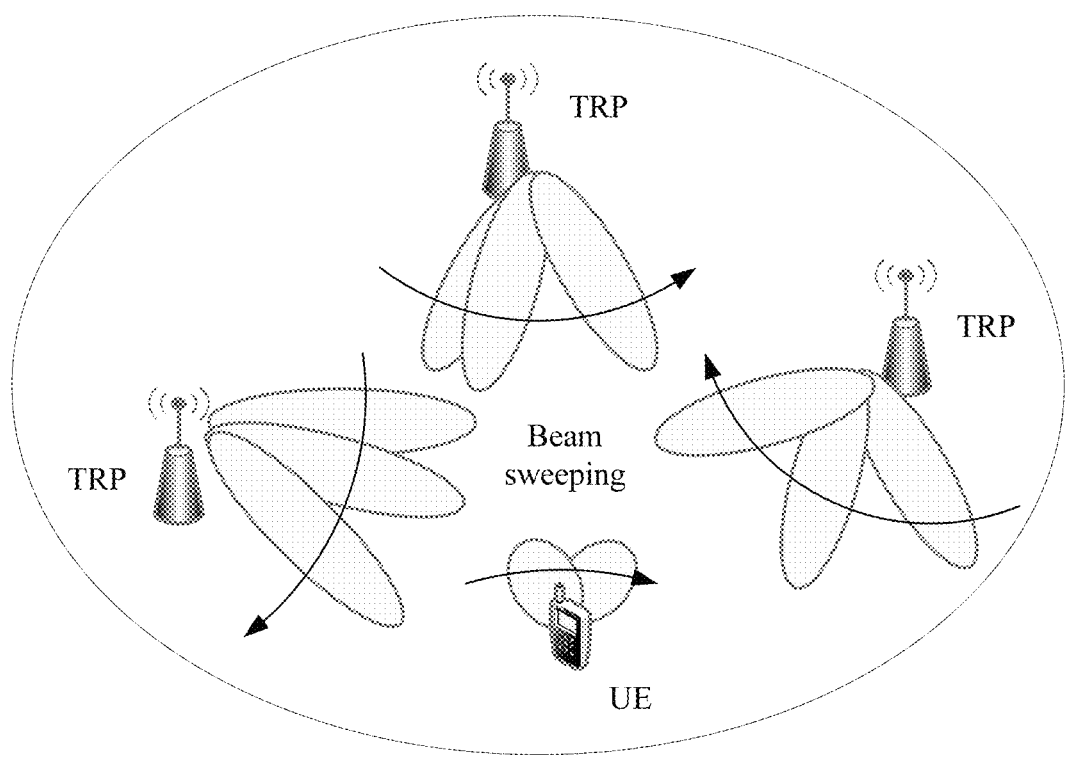
FIG. 1 is a schematic diagram of beam sweeping according to an embodiment of the present invention.
Figure 2:
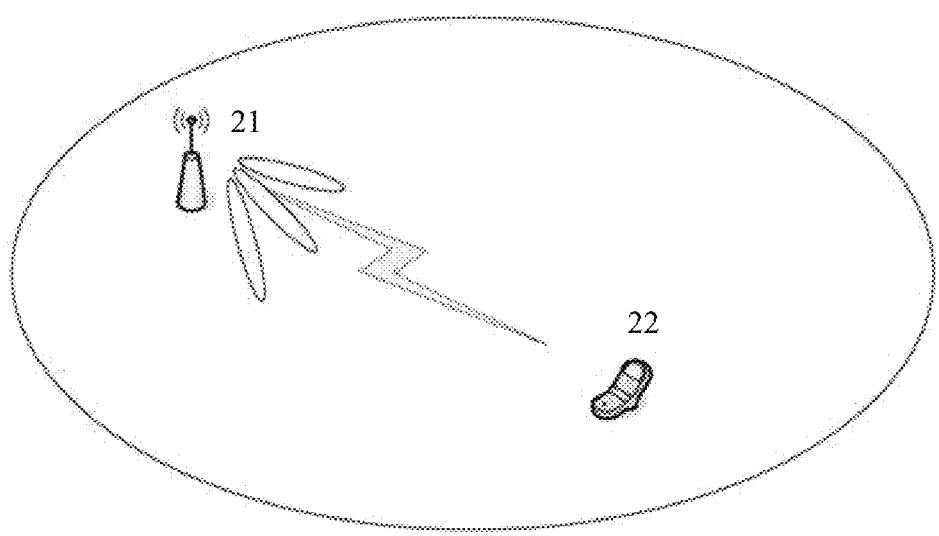
FIG. 2 is a schematic architectural diagram of an application scenario according to an embodiment of the present invention.

FIG. 2 is a schematic architectural diagram of an application scenario according to an embodiment of the present invention. A networking architecture shown in FIG. 2 mainly includes a network device 21 and a terminal device 22. The network device 21 communicates with the terminal device 22 by using a millimeter-wave band of a relatively high frequency, and the millimeter-wave band is usually a frequency band greater than or equal to 6 GHz, such as a frequency band of 28 GHz or 38 GHz, or an enhanced band (E-band) of a data plane with a relatively small coverage area. The terminal device 22 in coverage of the network device 21 may communicate with the network device 21 by using a millimeter-wave band of a relatively high frequency.

The network device may include one or more transmission reception points TRPs, and a controller may be responsible for managing the TRPs.

The terminal device 22 in this embodiment of the present invention may be an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in a 5G network, or the like.

The network device 21 in this embodiment of the present invention is a network side device operating on a frequency band of at least 6 GHz (including 6 GHz), such as a wireless fidelity (Wi-Fi) access point or a base station in next generation communication, such as a gNB, a small cell, or a micro cell of 5G, or may be a relay station or an access point operating on a high frequency band.

To resolve a problem that communication is blocked and a process such as initial access or beam training needs to be performed again because a communication link carried on a beam pair is easily at by mobility and rotation of a terminal device and blockage of another object in NR, the embodiments of the present invention provide a method for performing communication based on a beam group, and a device.

Figure 3:
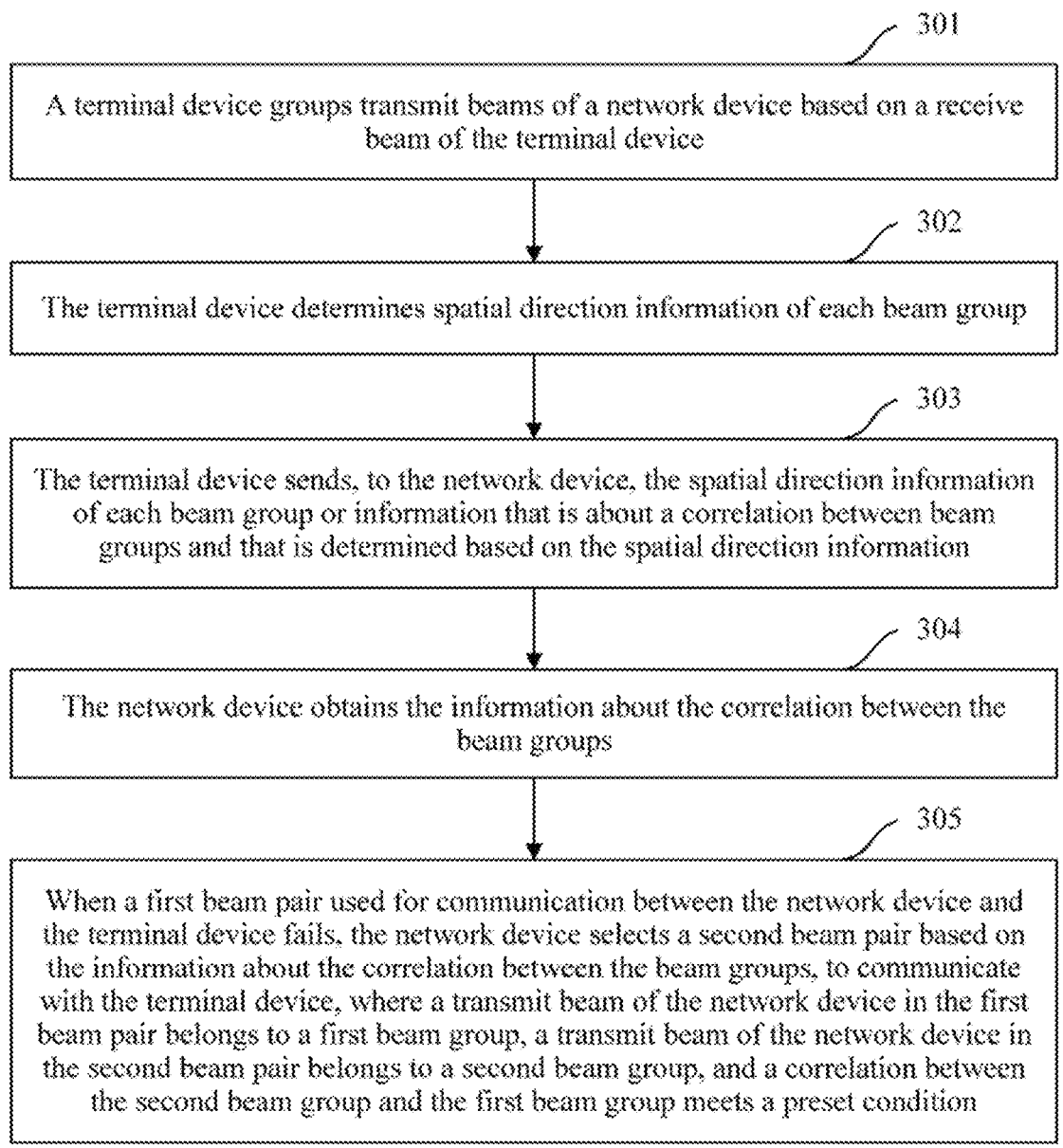
FIG. 3 is a schematic flowchart of a method for performing communication based on a beam group according to an embodiment of the present invention.

FIG. 3 is a schematic flowchart of a method for performing communication based on a beam group according to an embodiment of the present invention. As shown in the figure, the method includes the following steps.

Step 301: A terminal device groups transmit beams of a network device based on a receive beam of the terminal device.

In 5G NR, the network device usually communicates with the terminal by using a high-frequency and narrow-band transmit beam. In a cell, a TRP may be used to send a beam to enhance a coverage capability of the cell, and one TRP may further send a plurality of beams in different directions. Therefore, the terminal device may receive a plurality of beams, and some of the plurality of beams that can be received by the terminal device may need to be received by the terminal device by using a same receive beam. In this case, when a receive beam of the terminal device is blocked or is interfered with due to another factor and consequently cannot be used for normal receiving, none of a plurality of transmit beams that form beam pairs with the receive beam can be used to communicate with the terminal device.

For the foregoing reason, the terminal device may group a plurality of transmit beams of the network device that can be received by the terminal device, to simplify information that needs to be reported by the terminal device. For example, the terminal device may group, into one group transmit beams that each can form a beam pair with a same receive beam of the terminal device, and in this case, the terminal device needs to report only information about each beam group.

Although a receive beam of the terminal device is more easily blocked, a transmit beam of the network device may also be blocked or be subject to other interference, and consequently cannot operate normally. Therefore, a grouping manner is not limited to the foregoing example. For example, in a special embodiment, one beam pair may be used as one beam group, and in this case, the terminal device may not necessarily perform the step of grouping transmit beams of the network device.

Figure 4:
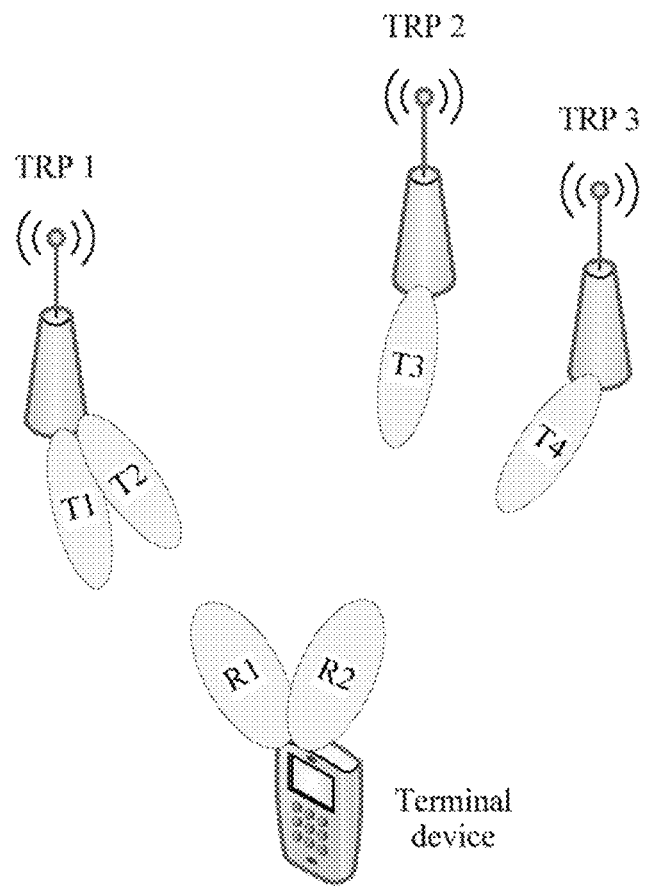
FIG. 4 is a schematic diagram of beam grouping according to an embodiment f the present invention.

As shown in FIG. 4, a transmit beam 1 and a transmit beam 2 of a TRP 1 each can form a beam pair with a first receive beam of the terminal device. Therefore, the terminal device may group the transmit beam 1 and the transmit beam 2 into one group. In addition, a transmit beam 3 of a TRP 2 and a transmit beam 4 of a TRP 3 each can form a beam pair with a second receive beam of the terminal device. Therefore, the terminal device may group the transmit beam 3 and the transmit beam 4 into one group.

The terminal device may send information about grouping of the transmit beams of the network device to the network device in a manner agreed on between the terminal device and the network device.

Step 302: The terminal device determines spatial direction information of each beam group.

When a receive beam of the terminal device is blocked and cannot be used to communicate with the network device, another receive beam whose direction is different from that of the blocked receive beam may not necessarily be blocked. Usually, two receive beams whose directions greatly differ from each other are less likely to be blocked at the same time. Therefore, information about a correlation between beam groups may be determined based on a spatial direction of each beam group.

If the terminal device groups, into one group, transmit beams that each can form a beam pair with a same receive beam of the terminal device, a spatial direction of the receive beam of the terminal device may be used as a spatial direction of the beam group corresponding to the receive beam. Certainly, a spatial direction of a beam group may alternatively be defined in another manner. For example, spatial directions of a plurality of transmit beams in one beam group may be fitted, and a spatial direction obtained through fitting is used as a spatial direction of the beam group.

The terminal device may determine the spatial direction information of each beam group in the following manners.

In a first manner, the terminal device determines components of a spatial direction of each beam group in a horizontal direction and a vertical direction.

Figure 5:
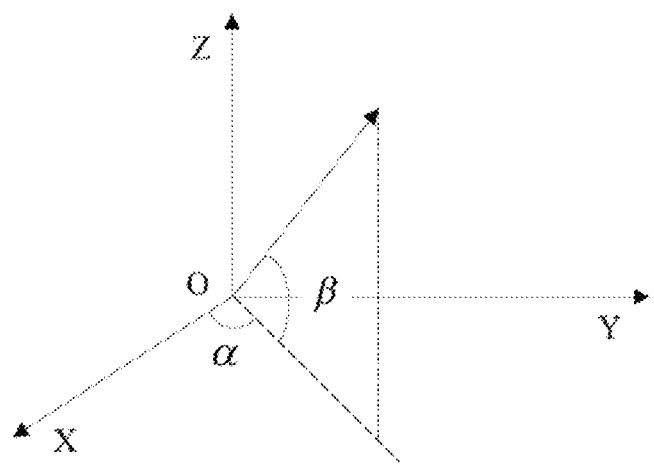
FIG. 5 is a schematic diagram of components of a spatial direction in a horizontal direction and a vertical direction according to an embodiment of the present invention.

Usually, a radiation direction of a beam may be represented by components in the horizontal direction and the vertical direction. For example, a schematic diagram of a spatial direction of a beam group may be shown in FIG. 5. The spatial direction of the beam group is projected onto a plane XOY. An included angle between an obtained ray and an x-axis is $\alpha$, in other words, a component in a horizontal direction is $\alpha$. An included angle between the spatial direction of the beam group and the plane XOY is $\beta$, in other words, a component in a vertical direction is $\beta$.

The terminal device sends, to the network device, the components of the spatial direction of the beam group in the horizontal direction and the vertical direction, and the network device can determine the spatial direction of the beam group based on the components in the horizontal direction and the vertical direction.

In a second manner, the terminal device determines, based on a pre-agreed quantization level in a horizontal direction and a pre-agreed quantization level in a vertical direction, quantization levels to which a spatial direction of each beam group belongs in the horizontal direction and the vertical direction.

The components of the spatial direction of the beam group in the horizontal direction and the vertical direction that are obtained in the first manner are relatively precise values. However, to obtain the relatively precise values, the terminal device needs to perform relatively precise calculation. This increases a load of the terminal device. In addition, when sending the relatively precise values to the network device, the terminal device may need to consume a relatively large quantity of signaling resources.

To reduce the load of the terminal device and signaling resource overheads, the quantization levels in the horizontal direction and the vertical direction may be preset. The network device can estimate a spatial direction of a beam group, and further obtain the information about the correlation between the beam groups through calculation, provided that the terminal device estimates quantization levels to which the spatial direction of the beam group respectively belongs in the horizontal direction and the vertical direction, and reports the quantization levels to the network device.

Figure 6:
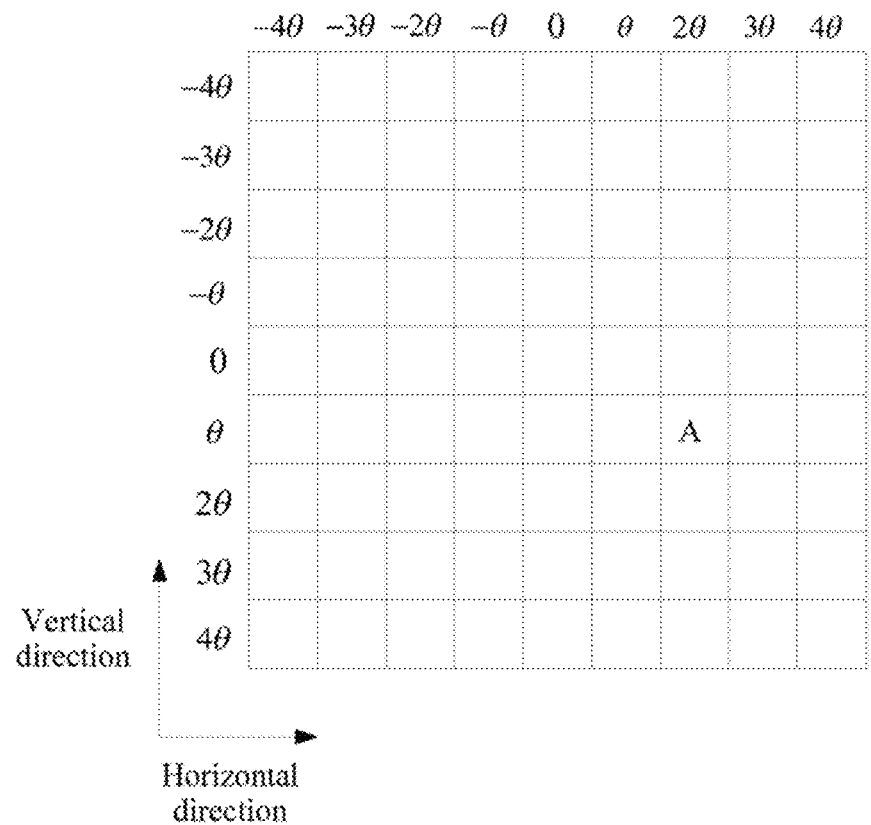
FIG. 6 is a schematic diagram of quantization levels of a spatial direction in a horizontal direction and a vertical direction according to an embodiment of the present invention.

In a specific embodiment, as shown in FIG. 6, grid division is performed on a plane both in a horizontal direction and a vertical direction by using $\theta$ as a unit. $\theta$ may be determined by the terminal device based on a beam sweeping capability of the terminal device. For example, $\theta$ may be an included angle between two receive beams of the terminal device in the horizontal direction or the vertical direction. Nine quantization levels: $-4\theta, -3\theta, -2\theta, \ldots,$ and $4\theta$ may be obtained through division in both the horizontal direction and the vertical direction, and distribution of receive beams of the terminal device may be basically covered by using the nine quantization levels.

It is assumed that a grid plane shown in FIG. 6 is vertically disposed directly in front of the terminal device. When grouping the transmit beams of the network device, the terminal device groups, into one group, transmit beams that each can form a beam pair with a same receive beam of the terminal device. Therefore, a spatial direction of a beam group is a spatial direction of a receive beam corresponding to the beam group. A first receive beam of the terminal device may be radiated to a grid A on the network plane, a component of the grid A in the horizontal direction belongs to a quantization level corresponding to θ, and a component of the grid A. In the vertical direction belongs to a quantization level corresponding to 2θ. Therefore, the terminal device may represent, by using [θ, 2θ], a spatial direction of the first receive beam, namely, a spatial direction of a beam group corresponding to the first receive beam. Further, if a value of θ is predetermined, or the terminal device sends a value of θ to the network device in advance, the terminal device may represent, by using [1, 2] the spatial direction of the first receive beam, namely, the spatial direction of the beam group corresponding to the first receive beam.

In a manner 3, the terminal device determines a direction vector for each beam group.

The terminal device may further construct the direction vector for each beam group, so that the network device may determine the information about the correlation between the beam groups based on the direction vector of each beam group.

Figure 7:
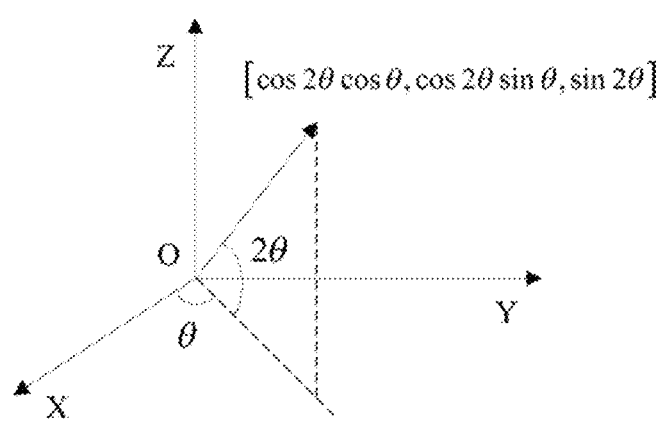
FIG. 7 is a schematic diagram of direction vector construction according to an embodiment of the present invention.

In a possible implementation, when determining the direction vector of a spatial direction of the beam group, the terminal device may first determine components of the spatial direction of the beam group in a horizontal direction and a vertical direction by using the method provided in the manner 1 or manner 2, and then further construct the direction vector based on the components in the horizontal direction and the vertical direction. For example, a schematic diagram of a spatial direction of a beam group may be shown in FIG. 7. The spatial direction of the beam group is projected onto a plane XOY. An included angle between an obtained ray and an x-axis is θ, in other words, a component in a horizontal direction is θ. An included angle between the spatial direction of the beam group and the plane XOY is 2θ, other words, a component in a vertical direction is 2θ. It may be learned through a spatial geometric operation that the vector V of the spatial direction may be represented as [cos 2θ cos θ, cos 2θ sin θ, sin 2θ]. Certainly, the components of the spatial direction of the beam group in the horizontal direction and the vertical direction may be alternatively relatively precise values, rather than approximating a multiple of the preset angle θ.

In a manner 4, the terminal device may alternatively determine a number of a spatial direction of each beam group according to a pre-agreed space area division rule.

A space area division rule may be predetermined, each space area is numbered, and the agreed space area division rule and a number corresponding to each space area are configured on the terminal device and the network device. When determining the spatial direction of the beam group, the terminal device determines, based on a radiation range of beams in the beam group, a space area to which the beam group belongs, and then determines the spatial direction of the beam group based on the space area. Alternatively, a spatial direction corresponding to a space area is calculated in advance, and is configured on the network device.

Figure 8:
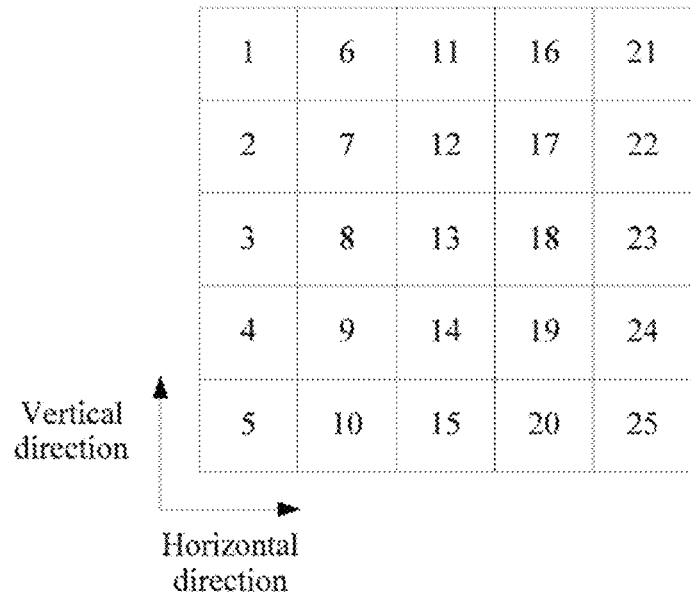
FIG. 8 is a schematic diagram of space area division according to an embodiment of the present invention.

In a specific embodiment, when a space area is divided, a vertical plane may be selected for the space area. As shown in FIG. 8, a result obtained after the division of the space area is projected onto the plane. It is assumed that the terminal is located directly in front of the grid plane shown in FIG. 8. When grouping the transmit beams of the network device, the terminal device groups, into one group, transmit beams that each can form a beam pair with a same receive beam of the terminal device. In other words, a spatial direction of a beam group is a spatial direction of a receive beam corresponding to the beam group. Therefore, if a first receive beam of the terminal device may be radiated to a grid 8 on the network plane, a radiation range of the first receive beam is a space area corresponding to a number 8. In other words, a beam range of a transmit beam in a beam group corresponding to the first receive beam may also be radiated to the space area numbered as 8. The terminal device may send the number 8 to the network device, so that the network device determines, based on the number 8, a space area of the beam group corresponding to the first receive beam, so as to determine a spatial direction of the beam group.

In some other embodiments, alternatively, the space area division rule may not be pre agreed, but formulated by the terminal device. In this case, when reporting the number of the spatial direction corresponding to each beam group, the terminal device further needs to send the space area division rule formulated by the terminal device to the network device.

Certainly, if one beam pair is one beam group, the terminal device needs to determine spatial direction information of each beam pair. A determining method is similar to the method for determining the spatial direction information of the beam group. Details are not described herein again.

Step 303: The terminal device sends, to the network device, the spatial direction information of each beam group or information that is about a correlation between beam groups and that is determined based on the spatial direction information.

In a possible implementation, the terminal device sends the determined spatial direction information of each beam group to the network device, so that the network device may determine the information about the correlation between the beam groups based on the spatial direction of each beam group. In the manner, a calculation amount of the terminal device is relatively small, and the load of the terminal device is not increased.

In another possible implementation, the terminal device may alternatively determine the information about the correlation between the beam groups based on the spatial direction information of each beam group, and send the information about the correlation between the beam groups to the network device, to reduce a calculation amount of the network device and reduce a load of the network device.

In some embodiments, the terminal device may determine components of a spatial direction of each beam group in a horizontal direction and a vertical direction based on the spatial direction information of each beam group; then separately group the beam groups based on the components in the horizontal direction and the components in the vertical direction; and the terminal device sends grouping information of the beam groups in the horizontal direction and the vertical direction to the network device.

Figure 9:
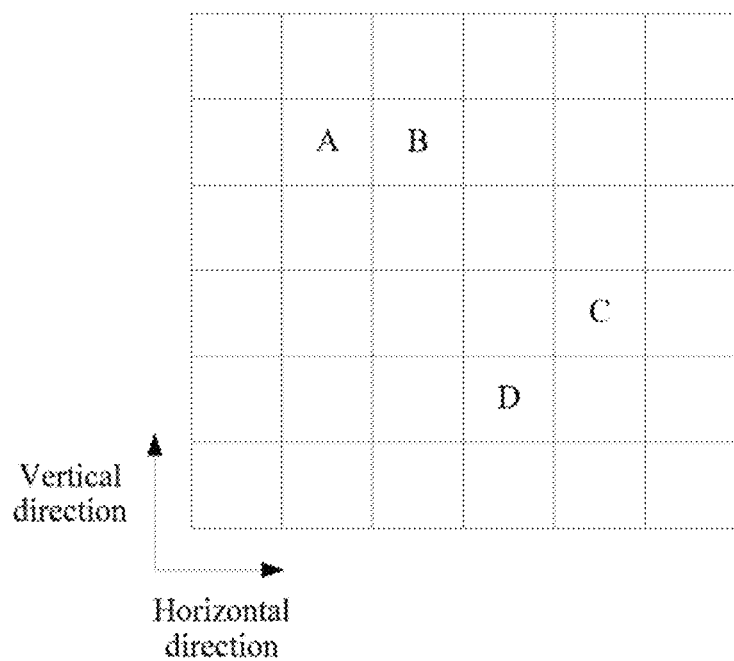
FIG. 9 is a schematic diagram of performing grouping for a spatial direction in a horizontal direction and a vertical direction according to an embodiment of the present invention.

For example, the terminal device groups the transmit beams of the network device into four groups. As shown in FIG. 9, grouping is performed based on components of each beam group in a horizontal direction and a vertical direction.

In the horizontal direction, a beam group A, a beam group B, a beam group C, and a beam group D belong to different groups. However, in the vertical direction, the beam group A and the beam group B belong to a same group, but the beam group C and the beam group D belong to different groups. For the beam group A, because the beam group A and the beam B belong to the same group in the vertical direction, it may be considered that a correlation between the beam group A and the beam group B is relatively high. Because both the beam group C and the beam group D belong to groups different from groups to which the beam group A belongs in the horizontal direction and the vertical direction, it may be considered that a correlation between the beam group C and the beam group A and a correlation between the beam group D and the beam group A are relatively low. Therefore, grouping performed based on the components of the spatial direction of each beam croup in the horizontal direction and the vertical direction may directly reflect the information about the correlation between the beam groups. The network device sends an analysis result to the network device, and the network device may obtain the information about the correlation between the beam groups.

The foregoing method embodiment is easily implemented. The terminal device may relatively conveniently and quickly determine the information about the correlation between the beam groups and report the information about the correlation to the network device.

In some other embodiments, the terminal device may alternatively determine information about a correlation between beam groups based on indication information of the network device. For example, if quality of current communication between the terminal device and the network device is relatively poor, the network device may send the indication information to the terminal device, so that the terminal device reports information about correlations between a first beam group and other beam groups. The first beam group is a beam group in which a receive beam currently serving the terminal device is located.

After receiving the indication information from the network device, the terminal device determines the information about the correlations between the first beam group and the other beam groups based on the determined spatial direction information of each beam group. The terminal device may send all the correlations between the other beam groups and the first beam group to the network device, or may sort the other beam groups based on the correlations between the other beam groups and the first beam group, and send a sorting result to the network device.

In a specific embodiment, when determining information about a correlation between two beam groups, the terminal device may determine a vector of a spatial direction of each beam group in the foregoing manner and then determine the correlation between the two beam groups by using a formula (1):

$$\text{Coherence} = \frac{|V_1^B V_2|}{\|V_1\|_2 \|V_2\|_2}, \quad (1)$$

where

Coherence represents a correlation between a first beam group and a second beam group, $V_1$ represents a vector of a spatial direction of the first beam group, and $V_2$ represents a vector of a spatial direction of the second beam group.

Optionally, the terminal device may perform step 303 after receiving the indication information that is sent by the network device for requiring the terminal to report the spatial direction information or related information. For example, the network device may add a field to information used to instruct the terminal device to perform measurement and reporting, where the field is used to instruct the terminal device to report the spatial direction information of the beam group or the information about the correlation between the beam groups; or when current communication quality is relatively poor, send the indication information to the terminal device, to instruct the terminal device to report the spatial direction information of the beam group or the information about the correlation between the beam groups.

Optionally, an occasion on which the terminal device sends the spatial direction information of each beam group may alternatively be pre-agreed. For example, it is pre-agreed that when reporting a measurement report, the terminal device adds, to the measurement report, the spatial direction information of each beam group or the information that is about the correlation between the beam groups and that is determined based on the spatial direction information.

If one beam pair is one beam group, the terminal device sends spatial direction information of each beam pair or a correlation between beam pairs to the network device. A sending method is similar to the method for sending information about beam groups. Details are not described herein again.

Step 304: The network device obtains the information about the correlation between the beam groups.

If the terminal device sends the information about the correlation between the beam groups to the network device in step 303, in step 304, the network device may directly obtain the information about the correlation between the beam groups from content reported by the terminal device.

If the terminal device sends the spatial direction information of each beam group to the network device in step 304, in step 304, the network device needs to determine the information about the correlation between the beam groups based on the spatial direction information that is of each beam group and that is sent by the terminal device.

Specifically, if the spatial direction information that is of each beam group and that is sent by the terminal device is the components of the spatial direction of each beam group in the horizontal direction and the vertical direction, the network device may determine the information about the correlation between the beam groups based on the components of the spatial direction of each beam group in the horizontal direction and the vertical direction. For example, the network device may construct the direction vector for the beam group based on the components in the horizontal direction and the vertical direction by using the foregoing method, and calculate the information about the correlation between the beam groups based on the direction vector.

Specifically, if the spatial direction information that is of each beam group and that is sent by the terminal device is the quantization levels to which the spatial direction of each beam group belongs in the horizontal direction and the vertical direction and that are determined based on the pre-agreed quantization level in the horizontal direction and the pre-agreed quantization level in the vertical direction, the network device may determine the spatial direction of each beam group based on the pre agreed quantization levels and the quantization levels to which each beam group belongs in the horizontal direction and the vertical direction, and then further determine the information about the correlation between the beam groups based on the spatial direction of each beam group.

Specifically, if the spatial direction information that is of each beam group and that is sent by the terminal device is the number of the spatial direction of each beam group, the network device determines, based on the number of the spatial direction of each beam group and the predetermined space area division rule, the area in which the spatial direction of each beam group is located, so as to determine the spatial direction of each beam group based on the area in which the spatial direction of each beam group is located, and further determine the information about the correlation between the beam groups.

Specifically, if the spatial direction information that is of each beam group and that is sent by the terminal device is the direction vector of each beam group, the network device calculates the information about the correlation between the beam groups based on the direction vector of each beam group. A specific calculation method may be shown in the formula (1), and details are not described herein again.

Certainly, if the terminal sends spatial direction information of a beam pair or information about a correlation between beam pairs, the network device obtains the information about the correlation between the beam pairs in step 304.

Step 305: When a first beam pair used for communication between the network device and the terminal device fails, the network device selects a second beam pair based on the information about the correlation between the beam groups, to communicate with the terminal device, where a transmit beam of the network device in the first beam pair belongs to a first beam group, a transmit beam of the network device in the second beam pair belongs to a second beam group, and a correlation between the second beam group and the first beam group meets a preset condition.

In step 305, when selecting the second beam pair, the network device may first determine a second beam group whose correlation with the first beam group meets the preset condition, and then select a second beam from the second beam group, to form a second beam pair with a receive beam that is of the terminal device and that corresponds to the second beam group, where the second beam pair is used for communication between the network device and the terminal device.

In high-frequency communication, a scattering capability and a diffraction capability of a radio wave are greatly weakened. Therefore, a beam pair is easily affected by mobility and rotation of a terminal device and blockage of another object. Consequently, communication between a network device and the terminal device cannot be normally performed. In other words, the beam pair fails. In the prior art, in this case, the terminal device needs to perform a process such as initial access or beam training again, to recover communication. This is very time-consuming and complex. However, after the method provided in this embodiment of the present invention is applied, if the first beam pair that is currently being used for communication fails, the network device may select a second beam pair that has a relatively low correlation with the first beam pair for communication, thereby preventing the terminal from performing, a process such as initial access or beam training again, and improving system robustness.

If a transmit beam in a first beam group and a first receive beam of the terminal device can form a beam pair, a transmit beam in a second beam group and a second receive beam of the terminal device can form a beam pair, and a correlation between the first beam group and the second beam group is relatively low, when the beam pair formed by the transmit beam belonging to the first beam group and the first receive beam of the terminal device is blocked and consequently cannot be used for normal communication, the network device may recover communication by using the beam pair formed by the transmit beam in the second beam group and the second receive beam of the terminal device, thereby preventing the terminal device from performing a process such as initial access or beam training again. In contrast, if a correlation between the first beam group and the second beam group is relatively high, when the beam pair formed by the transmit beam belonging to the first beam group and the first receive beam of the terminal device is blocked, a possibility that the transmit beam in the second beam group and the second receive beam of the terminal device are blocked is also relatively high. If the network device recovers communication by using the beam pair thrilled by the transmit beam in the second beam group and the second receive beam of the terminal device, a failure possibility is also relatively high.

Therefore, when determining the second beam group, the network device may select, as the second beam group, a beam group that has a lowest correlation with the first beam group in all beam groups maintained by the network device; or may select, as the second beam group, one of beam groups whose correlations with the first beam group are less than or equal to a preset threshold, for example, may select, based on a load status of each beam group, a second beam group from beam groups that meet a condition; or may randomly select, as the second beam group, a beam group that meets a condition.

After determining the second beam group, the network device may select a second beam from the second beam group based on a load status of each beam in the beam group, or may randomly select a beam as a second beam.

If the terminal sends the spatial direction information of the beam pair or the information about the correlation between the beam pairs, in step 305, the network device selects, based on the information about the correlation between the beam pairs, a second beam that has a relatively low correlation with the first beam pair for communication.

In another possible implementation, when the first beam pair used for communication between the network device and the terminal device fails before the network device performs step 305, or communication is still not recovered after step 305 is performed, the terminal device may further actively initiate a communication recovery process. If the terminal device has determined the information about the correlation between the beam groups based on the spatial direction information of each beam group, the terminal device may directly select, based on the information about the correlation between the beam groups, a receive beam corresponding to the second beam group to send an access request to the network device. For example, the terminal device may send the access request to the network device by using a dedicated random access resource carried on the receive beam corresponding to the second beam group. If the terminal device determines only the spatial direction information of each beam group, and has not determined the information about the correlation between the beam groups, the terminal device tray first determine the information about the correlation between the beam groups by using the foregoing method, and then select, based on the information about the correlation between the beam groups, the receive beam corresponding to the second beam group to send an access request to the network device.

A method for determining the second beam group by the terminal device is similar to the method for determining the second beam group by the network device. Details are not described herein again.

In the foregoing method embodiment, the terminal device sends the spatial direction information of the beam group or the information about the correlation between the beam groups to the network device, so that the network device obtains the information about the correlation between the beam groups, selects, based on the information about the correlation between the beam groups, a beam pair from two or more beam groups having low correlations, and configures the terminal device to detect physical downlink control channels (PDCCH) on the beams in an agreed manner, to improve robustness of a communication link. Uplink data and downlink data are separately transmitted by using beam pairs having a relatively low correlation. This helps improve robustness of the link and helps quickly recover link quality.

Figure 10:
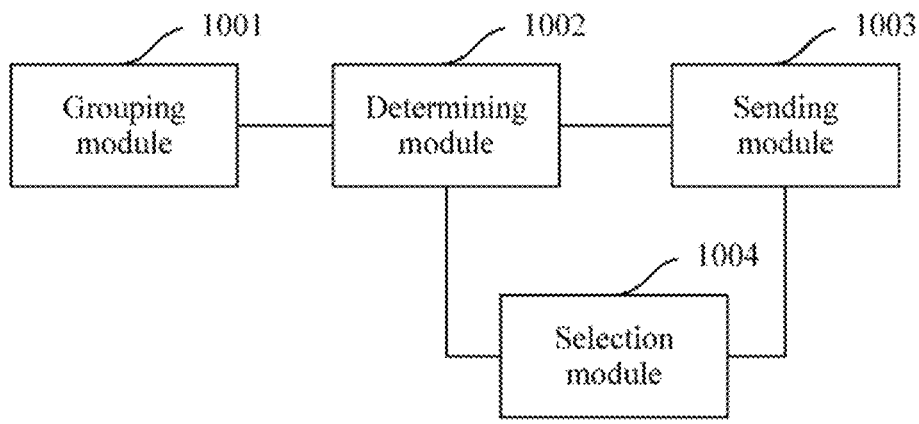
FIG. 10 is a schematic structural diagram of a terminal device according to an embodiment of the present invention.

Based on a same technical concept, an embodiment of the present invention further provides a terminal device, to implement the foregoing method embodiment. FIG. 10 is a schematic structural diagram of a terminal device according to an embodiment of the present invention. As shown in the figure, the terminal device includes a grouping module 1001, a determining module 1002, and a sending module 1003.

The grouping module 1001 is configured to group transmit beams of a network device based on a receive beam of the terminal device.

The determining module 1002 is configured to determine spatial direction information of each beam group.

The sending module 1003 is configured to send, to the network device, the spatial direction information of each beam group or information that is about a correlation between the beam groups and that is determined based on the spatial direction information.

Optionally, when determining the spatial direction information of each beam group, the determining module 1002 is configured to:

determine components of a spatial direction of each beam group in a horizontal direction and a vertical direction; or determine a direction vector of a spatial direction of each beam group; or determine, based on a pre-agreed quantization level in a horizontal direction and a pre-agreed quantization level in a vertical direction, quantization levels to which a spatial direction of each beam group respectively belongs in the horizontal direction and the vertical direction; or determine a number of a spatial direction of each beam group, where the number of the spatial direction is determined according to a pre-agreed space area division rule.

Optionally, the determining module is further configured to: determine components of a spatial direction of each beam group in a horizontal direction and a vertical direction based on the spatial direction information; group the beam groups based on the components in the horizontal direction; and group the beam groups based on the components in the horizontal direction. When sending, to the network device, the information that is about the correlation between the beam groups and that is determined based on the spatial direction information, the sending module 1003 is configured to send grouping information of the beam groups in the horizontal direction and the vertical direction to the network device.

Optionally, the determining module 1002 is further configured to calculate, according to indication information received from the network device, information about correlations between a beam group in which a receive beam currently serving the terminal device is located and other beam groups. When sending, to the network device, the information that is about the correlation between the beam groups and that is determined based on the spatial direction information, the sending module 1003 is configured to: send the calculated information about the correlations to the network device; or sort the other beam groups based on the calculated information about the correlations, and send a sorting result to the network device.

Optionally, the terminal device further includes a selection module 1004, configured to: when a first beam pair currently used for communication between the network device and the terminal device fails, select a second beam pair based on the information that is about the correlation between the beam groups and that is determined based on the spatial direction information of each beam group. A transmit beam of the network device in the first beam pair belongs to a first beam group, a transmit beam of the network device in the second beam pair belongs to a second beam group, and a correlation between the second beam group and the first beam group meets a preset condition. The sending module 1003 is further configured to send an access request to the network device by using the second beam pair.

Figure 11:
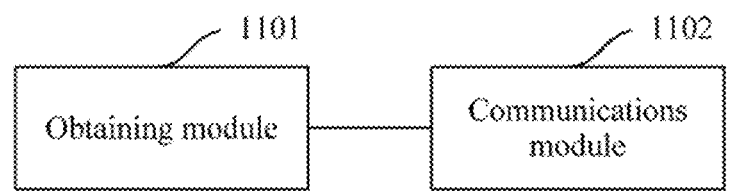
FIG. 11 is a schematic structural diagram of a network device according to an embodiment of the present invention.

Based on a same technical concept, an embodiment of the present invention further provides a network device, to implement the foregoing method embodiment. FIG. 11 is a schematic structural diagram of a network device according to an embodiment of the present invention. As shown in the figure, the network device includes an obtaining module 1101 and a communications module 1102.

The obtaining module 1101 is configured to obtain information about a correlation between beam groups, where the beam groups are obtained after transmit beams of the network device are grouped based on a receive beam of a terminal device.

The communications module 1102 is configured to: when a first beam pair currently used for communication between the network device and the terminal device fails, select a second beam pair based on the information about the correlation between the beam groups, to communicate with the terminal device, where a transmit beam of the network device in the first beam pair belongs to a first beam group, a transmit beam of the network device in the second beam pair belongs to a second beam group, and a correlation between the second beam group and the first beam group meets a preset condition.

Optionally, the second beam group is a beam group that has a lowest correlation with the first beam group in all beam groups maintained by the network device; or the correlation between the second beam group and the first beam group is less than or equal to a preset threshold.

Optionally, the obtaining module 1101 is configured to: receive the information that is about the correlation between the beam groups and that is sent by the terminal device; or receive spatial direction information that is of each beam group and that is sent by the terminal device, and determine the information about the correlation between the beam groups based on the spatial direction information.

Optionally, if the spatial direction information that is of each beam group and that is sent by the terminal device is a number of a spatial direction of each beam group, when determining the information about the correlation between the beam groups based on the spatial direction information, the obtaining module 1101 is configured to: determine, based on the number of the spatial direction of each beam group and a pre-agreed space area division rule, an area in which the spatial direction of each beam group is located, and determine the information about the correlation between the beam groups based on the area in which the spatial direction of each beam group is located.

Optionally, if the spatial direction information that is of each beam group and that is sent by the terminal device is components of a spatial direction of each beam group in a horizontal direction and a vertical direction, when determining the information about the correlation between the beam groups based on the spatial direction information, the obtaining module 1101 is configured to: construct a direction vector for each beam group based on the components of the spatial direction of each beam group in the horizontal direction and the vertical direction, and determine the information about the correlation between the beam groups based on the direction vector.

Optionally, if the spatial direction information that is of each beam group and that is sent by the terminal device is a direction vector of each beam group, when determining the information about the correlation between the beam groups based on the spatial direction information, the obtaining module 1101 is configured to calculate the information about the correlation between the beam groups based on the direction vector.

Optionally, the communications module 1102 is further configured to send indication information to the terminal device, where the indication information is used to obtain information about correlations between a first beam group and other beam groups. When receiving the information that is about the correlation between the beam groups and that is sent by the terminal device, the obtaining module 1101 is configured to receive the information that is about the correlations between the first beam group and the other beam groups and that is sent by the terminal device.

In addition, the network device and the terminal device in the foregoing apparatus embodiments have another form of embodiment, that is, functions of the sending module or the communications module are implemented by a transceiver. Corresponding steps in another method embodiment are implemented by a processor. For example, functions of the determining module, the calculation module, or the selection module are implemented by the processor. For functions of the transceiver and the processor, refer to the corresponding steps of the method embodiment. Details are not described one by one herein again.

Figure 12:
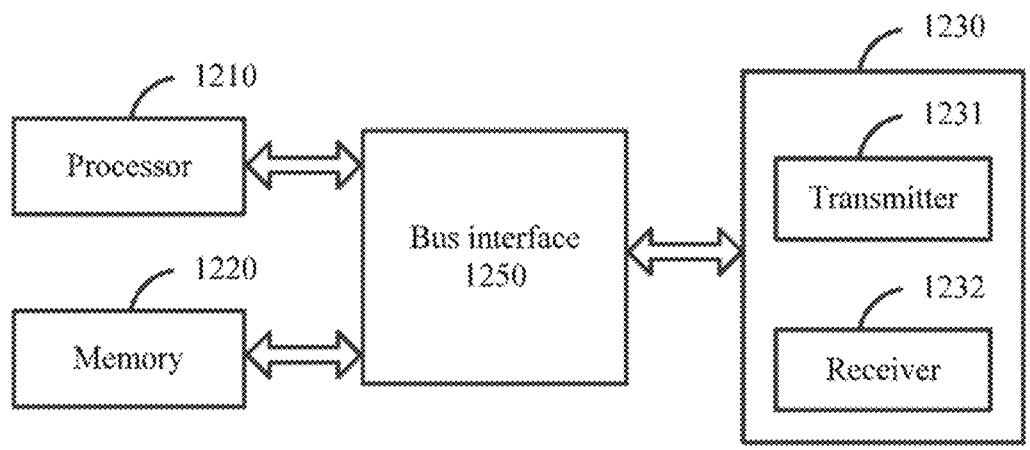
FIG. 12 is a schematic structural diagram of another device according to an embodiment of the present invention.

For a specific structure of the network device or the terminal device, refer to FIG. 12. A processor 1210 may be a general-purpose processor, a digital signal processor, an application-specific integrated circuit, a field programmable gate array, or another programmable logic device.

A transceiver 1230 may include a transmitter 1231 and a receiver 1232. The network device or the terminal device may further include an antenna (not shown in the figure), and there may be one or more antennas. The network device or the terminal device may further include a user interface (not shown in the figure), such as a keyboard, a microphone, a speaker, and/or a touchscreen. The user interface is configured to: transfer content and control an operation instruction.

The foregoing components may be coupled together by using a bus interface 1250. In addition to a data bus, the bus interface 1250 includes a power bus, a control bus, and a status signal bus. However, for clarity of description, various buses in the figure are marked as the bus interface 1250.

In addition, the network device or the terminal device may further include a memory 1220, such as a read-only memory (ROM) and/or a random access memory (RAM), another type of dynamic storage device that may store information and an instruction, or a magnetic disk storage. The memory 1220 may be configured to store an instruction used tier implementing the related method provided in the embodiments of the present invention.

A person skilled in the art should understand that the embodiments of the present invention may be provided as a method, a system, or a computer program product. Therefore, the embodiments of the present invention may use a form of hardware only embodiments, software only embodiments, or embodiments with a combination of software and hardware. Moreover, the embodiments of the present invention may use a form of a computer program product that is implemented on one or more computer-usable storage media (including but not limited to a magnetic disk memory, a CD-ROM, an optical memory, and the like) that include computer-usable program code.

The embodiments of the present invention are described with reference to the flowcharts and/or block diagrams of the method, the device (system), and the computer program product according to the embodiments of the present invention. It should be understood that computer program instructions may be used to implement each process and or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to operate in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to the embodiments of the present invention without departing from the spirit and scope of this application. This application is intended to cover these modifications and variations to the embodiments of the present invention provided that they fall within the scope of protection defined by the following claims and their equivalent technologies of this application.

What is claimed is:

1. A method for performing communication based on a beam group, comprising:
grouping, by a terminal device, transmit beams of a network device based on a receive beam of the terminal device;
determining, by the terminal device, components of spatial direction information of each beam group; and sending, by the terminal device to the network device, the spatial direction information determined for each beam group for correlating beam groups based on each of the components of the spatial direction information or information about a correlation between the beam groups determined based on each of the components of the spatial direction information.

2. The method according to claim 1, wherein the determining, by the terminal device, the spatial direction information of each beam group comprises:
determining, by the terminal device, the components of the spatial direction of each beam group in a horizontal direction and a vertical direction; or
determining, by the terminal device, a direction vector of the spatial direction of each beam group; or
determining, by the terminal device based on a pre-agreed quantization level in a horizontal direction and a pre-agreed quantization level in a vertical direction, quantization levels to which the spatial direction of each beam group respectively belongs in the horizontal direction and the vertical direction; or
determining, by the terminal device, a number of the spatial direction of each beam group, wherein the number of the spatial direction is determined according to a pre-agreed space area division rule.

3. The method according to claim 1, wherein the sending, by the terminal device to the network device, information about the correlation between the beam groups determined based on the spatial direction information comprises:
determining, by the terminal device, the components of the spatial direction of each beam group in a horizontal direction and a vertical direction based on the spatial direction information;
grouping, by the terminal device, the beam groups based on the components in the horizontal direction;
grouping, by the terminal device, the beam groups based on the components in the vertical direction; and
sending, by the terminal device, grouping information of the beam groups in the horizontal direction and the vertical direction to the network device.

4. The method according to claim 1, wherein the sending, by the terminal device to the network device, information about the correlation between the beam groups determined based on the spatial direction information comprises:
calculating, by the terminal device according to indication information received from the network device, information about correlations between a beam group in which a receive beam currently serving the terminal device is located and other beam groups; and
sending, by the terminal device, the calculated information about the correlations to the network device; or
sorting, by the terminal device, the other beam groups based on the calculated information about the correlations, and sending a sorting result to the network device.

5. A method for performing communication based on a beam group, further comprising:
grouping, by a terminal device, transmit beams of a network device based on a receive beam of the terminal device;
determining, by the terminal device, spatial direction information of each beam group;
sending, by the terminal device to the network device, the spatial direction information of each beam group or information about a correlation between the beam groups determined based on the spatial direction information; and when a first beam pair currently used for communication between the network device and the terminal device fails, selecting, by the terminal device, a second beam pair based on the information about the correlation between the beam groups determined based on the spatial direction information of each beam group, to send an access request to the network device, wherein a transmit beam of the network device in the first beam pair belongs to a first beam group, a transmit beam of the network device in the second beam pair belongs to a second beam group, and a correlation between the second beam group and the first beam group meets a preset condition.

6. A terminal device, comprising:
a memory;
a transceiver; and
a processor, coupled with the memory and the transceiver, wherein the processor is configured to read a program in the memory, causing the processor to perform the following process:
grouping transmit beams of a network device based on a receive beam of the terminal device;
determining components of spatial direction information of each beam group; and
sending, to the network device using the transceiver, the spatial direction information determined for each beam group for correlating beam groups based on each of the components of the spatial direction information or information about a correlation between the beam groups determined based on each of the components of the spatial direction information.

7. The terminal device according to claim 6, wherein when determining the spatial direction information of each beam group, the processor is configured to:
determine the components of the spatial direction of each beam group in a horizontal direction and a vertical direction; or
determine a direction vector of the spatial direction of each beam group; or
determine, based on a pre-agreed quantization level in a horizontal direction and a pre-agreed quantization level in a vertical direction, quantization levels to which the spatial direction of each beam group respectively belongs in the horizontal direction and the vertical direction; or
determine a number of the spatial direction of each beam group, wherein the number of the spatial direction is determined according to a pre-agreed space area division rule.

8. The terminal device according to claim 6, wherein when sending, to the network device using the transceiver, the information about the correlation between the beam groups determined based on the spatial direction information, the processor is configured to:
determine the components of the spatial direction of each beam group in a horizontal direction and a vertical direction based on the spatial direction information;
group the beam groups based on the components in the horizontal direction;
group the beam groups based on the components in the vertical direction; and
send, using the transceiver, grouping information of the beam groups in the horizontal direction and the vertical direction to the network device.

9. The terminal device according to claim 6, wherein when sending, to the network device using the transceiver, the information about the correlation between the beam groups determined based on the spatial direction information, the processor is configured to:
- calculate, according to indication information received from the network device, information about correlations between a beam group in which a receive beam currently serving the terminal device is located and other beam groups; and
- send the calculated information about the correlations to the network device by using the transceiver; or sort the other beam groups based on the calculated information about the correlations, and send a sorting result to the network device by using the transceiver.

10. The terminal device according to claim 6, wherein the processor is further configured to:
- when a first beam pair currently used for communication between the network device and the terminal device fails, select a second beam pair based on the information about the correlation between the beam groups determined based on the spatial direction information of each beam group, to send an access request to the network device by using the transceiver, wherein
- a transmit beam of the network device in the first beam pair belongs to a first beam group, a transmit beam of the network device in the second beam pair belongs to a second beam group, and a correlation between the second beam group and the first beam group meets a preset condition.

\* \* \* \* \*